United States Patent
Ogushi

(10) Patent No.: US 6,834,809 B2
(45) Date of Patent: Dec. 28, 2004

(54) CARD PROCESSOR

(75) Inventor: Yasushi Ogushi, Kyoto (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 10/689,674

(22) Filed: Oct. 22, 2003

(65) Prior Publication Data

US 2004/0079806 A1 Apr. 29, 2004

(30) Foreign Application Priority Data

Oct. 29, 2002 (JP) .......................... 2002-314209

(51) Int. Cl.⁷ .................. G06K 13/06; G06K 13/24; G06K 19/06
(52) U.S. Cl. .................. 235/483; 235/379; 235/380; 235/492; 235/493
(58) Field of Search .............. 235/379, 380, 235/381, 382, 435, 437, 492, 493; 902/25, 26, 28, 31

(56) References Cited

U.S. PATENT DOCUMENTS

| | | | | |
|---|---|---|---|---|
| 3,849,614 A | * | 11/1974 | Connery ............... | 200/61.41 |
| 5,850,079 A | * | 12/1998 | Ohwa et al. ........... | 235/475 |
| 6,059,592 A | * | 5/2000 | Inadama ............... | 439/188 |
| 6,588,659 B2 | * | 7/2003 | May .................. | 235/380 |
| 6,616,050 B1 | * | 9/2003 | Oki et al. ............. | 235/479 |

FOREIGN PATENT DOCUMENTS

| | | | |
|---|---|---|---|
| EP | 0236846 A | | 9/1987 |
| EP | 0 696 008 A3 | | 10/1989 |
| EP | 0 696 008 A2 | | 10/1989 |
| JP | 2001-167513 | | 6/2001 |
| JP | 2001222686 | * | 8/2004 |

* cited by examiner

*Primary Examiner*—Karl D Frech
*Assistant Examiner*—Daniel Walsh
(74) *Attorney, Agent, or Firm*—Dickstein Shapiro Morin & Oshinsky LLP

(57) ABSTRACT

A card reader includes a stopper or wall at the back of an insertion passage where a card is inserted. If a breakage of the wall at the back of the insertion passage is detected, the card processor drives the shutter to block the insertion port. This reliably prevents such an occurrence that the customer inserts the card through the insertion portion without knowing that the wall has been broken, pushes the card until even a portion of the card is not exposed at the recessed portion, finds himself unable to take out the card that is pushed in, and goes for a clerk in charge, and that the card stolen by the thief.

7 Claims, 8 Drawing Sheets

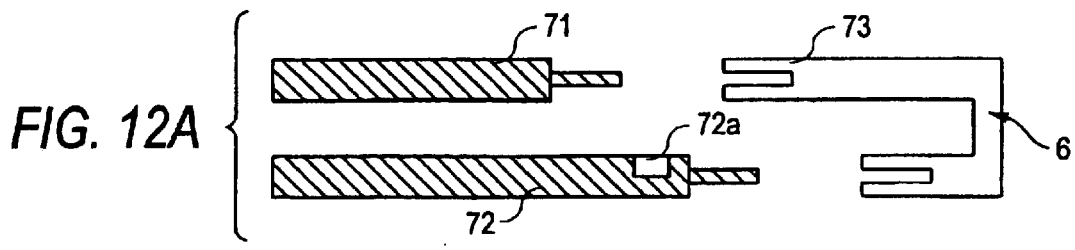
FIG. 12A
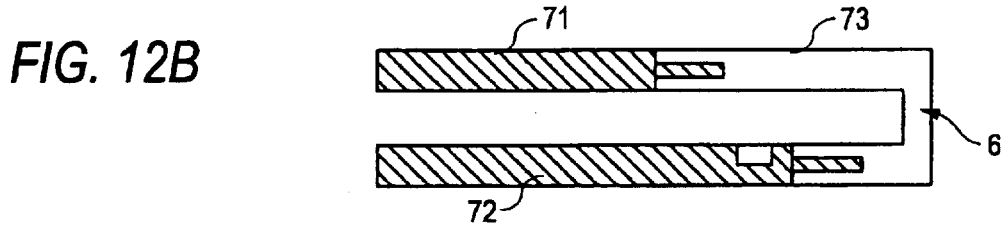
FIG. 12B
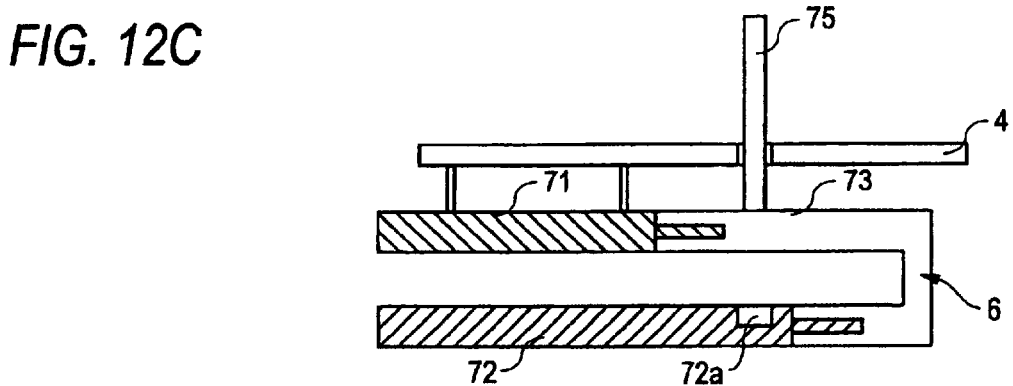
FIG. 12C
FIG. 13
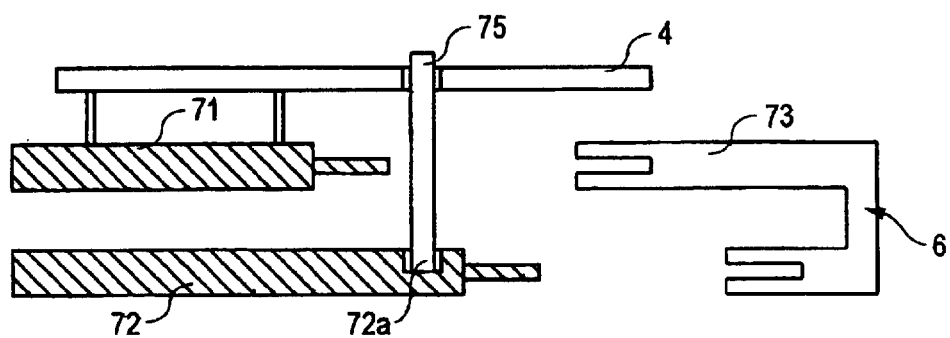

CARD PROCESSOR

FIELD OF THE INVENTION

1. Field of the Invention

This invention relates to a card processor for reading card data recorded in a card such a magnetic card or an IC card inserted in the insertion passage. More specifically, the invention relates to a card processor with which a customer inserts the card in the main body and pulls out or removes the card from the main body by hand.

2. Background of the Invention

There has been proposed a card processor for reading card data recorded in a magnetic card or an integrated circuit (IC) card. The card processor has been utilized in a variety of apparatuses such as an automated teller machine (ATM) installed in banking facilities.

Japanese patent publication JP-A-2001-167513 describes a manual type of card processor where the customer inserts the card through the insertion portion up to a set position, and pulls out the card from the set position or removes the card from the main body by hand.

In the manual type of magnetic card processor, the magnetic head is brought into contact with a magnetic stripe of the card to read the card magnetic data recorded in the card while the customer is inserting the card through the insertion portion up to the set position, or while the customer is removing the card from the set position. In the manual IC card processor, further, an IC contact is connected to an IC chip of the IC card inserted up to the set position to thereby read the electronic card data.

The insertion portion of a manual card processor is formed in a recessed shape by being cut away in a direction in which the card is inserted. Therefore, a rear end of the card at the set position is exposed to the external side. This permits the customer to pinch the rear end of the card until the card is inserted up to the set position or until the card is pulled out from the set position. The insertion passage is equipped with a wall or a pin with which a leading end of the card at the set position comes in contact, so that a card that has reached the set position will stop. Thus, the wall or pin works as a stopper for limiting the length of insertion of the card.

However, some customers of the manual card processor have become victims of a scam as described below, and thus, it has been urged to develop a card processor which is resistant to following scenario.

A thief inserts a steel plate in the card insertion portion. The steel plate has a thickness approximately equal as a card and a length longer than the card in the direction of insertion. When the leading end of the steel plate comes in contact with the stopper, the rear end of the steel plate is exposed to the outer side and is hit with a hammer to further drive the steel plate, thereby breaking the stopper. The steel plate is removed from the card processor, and the thief hides and waits for a customer to come.

The customer inserts his card up to the set position. However, since the stopper has been broken, the leading end of the card does not come in contact with the stopper. Accordingly, the customer pushes his card (beyond the set position) until the rear end of the card is no longer exposed to the external side. He finds himself no longer able to remove the card. He then looks for a clerk in charge.

While the customer is away from the card processor, the thief pulls out the card using, for example, a pair of tweezers.

SUMMARY OF THE INVENTION

It is an object of this invention to provide a card processor capable of preventing the card from being stolen by cheating by notifying the breakage of the stopper or card processor or by executing an error processing such as inhibiting the insertion of the card. The card processor of this invention includes an insertion passage which is provided with a stopper member. Additionally, there is a breakage detector for detecting whether said stopper member has been broken, and an error processor for executing an error process when the breakage detector senses that the stopper member has been broken. When the card is inserted by a predetermined length into the insertion passage formed in the main body, the leading end of the card comes in contact with the stopper member. Therefore, if the stopper member has not been broken, the card is not inserted in the main body in excess of a predetermined length. By forming the insertion passage so that a card which has its leading end in contact with the stopper member is exposed at its rear end to the external side, the customer can insert and take out or remove the card. The stopper member may have any shape with which will come in contact the leading end of the card that is inserted by, for example, a predetermined length, and may be a wall formed in the direction of width of the card or may be a plurality of pins arranged in the direction of width of the card.

The card may be, for example, a magnetic card, an IC card or a composite card thereof In the case of the magnetic card, the magnetic head is brought into contact with the magnetic stripe of the magnetic card to read the card data recorded therein while the card is being inserted in the main body or is taken out from the main body. In the case of the IC card, the terminal portion on the side of the main body may be electrically connected to an IC chip of the IC card inserted by a predetermined length in the main body to read the card data.

Further, the breakage detector detects any breakage of the stopper. When the breakage of the stopper is detected, the error processing is executed by the error processor. The error processing executed by the error processor may be the one for blocking the insertion passage by a shutter or the like so that the card cannot be inserted in the main body, or may be the one demonstrating the breakage of the stopper member and producing an alarm sound so that the customer will not insert the card in the main body.

The card reader of the present invention therefore prevents a customer from inserting a card into a card reader having a broken stopper member and, hence, prevents the customer from inserting the card so deeply into card reader that the card cannot be taken out.

In accordance with another aspect of the invention, the breakage detector can detect whether a conductor/conducting-wire that runs along the stopper member has been cut. The conductor runs along the stopper member, and the conductor is cut if the stopper member is broken. Thus, whether the stopper member is broken can be detected by determining whether the conductor is cut.

Alternatively, the stopper member can include a pawl portion formed at a position between a light-emitting unit and a light-receiving unit arranged facing each other, and the breakage detector means detects whether the light-receiving unit is receiving light emitted from the light-emitting unit. If the stopper member is broken, the pawl member moves from between the light-emitting unit and the light-receiving unit that are arranged facing each other, and light emitted from the light-emitting unit is received by the light-receiving unit.

Therefore, whether the stopper member is broken can be detected by determining whether light emitted from the light-emitting unit is received by the light-receiving unit.

According to another aspect of the invention, the card reader may include a shielding member which is directly or indirectly anchored to said stopper member, and shields the insertion passage when the stopper member has been broken or is in a state of not being anchored. The insertion passage is shielded when the shielding member which is directly or indirectly anchored to the stopper member, or when the shielding member is no longer anchored due to the breakage of the stopper member. Therefore, when the stopper member is broken, the customer is prevented from inserting the card in the main body.

In accordance with another aspect of the present invention, the breakage detection notifies a host unit connected to the card processor when the stopper member broken. The host unit notifies the customer of the interruption of service or the interruption of the card processing.

BRIEF DESCRIPTION OF THE DRAWINGS

FIG. 1, comprising

FIG. 4, comprising

FIG. 5, comprising

FIG. 7, comprising

FIG. 8, comprising

FIG. 10, comprising

FIG. 11, comprising

FIG. 12, comprising FIGS. 12A, 12B, and 12C, illustrates the card processor according to a still further embodiment.

FIG. 13 illustrates the card processor according to a yet further embodiment.

DETAILED DESCRIPTION OF THE INVENTION

The card processor according to an embodiment of the invention will now be described.

Figure 1A:
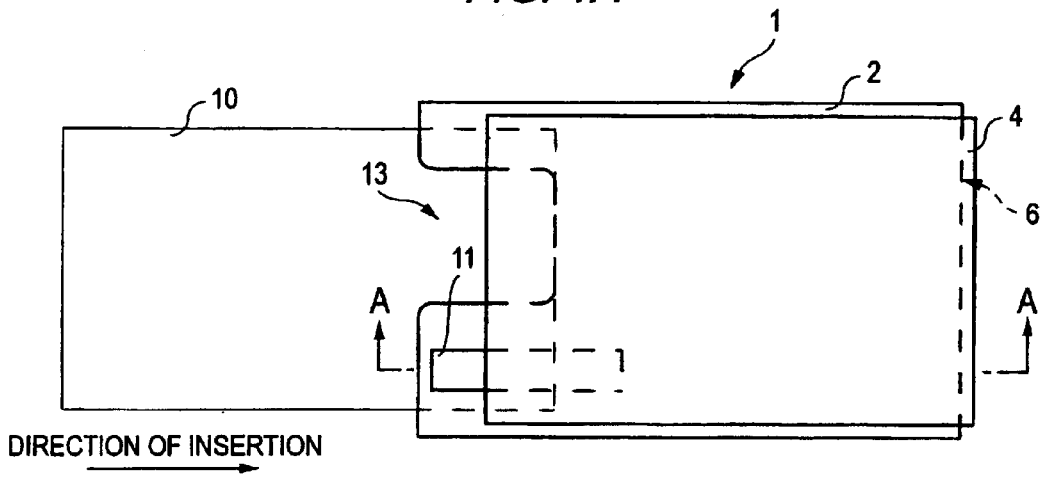
FIGS. 1A, 1B, and 1C, illustrates a card processor according to an embodiment of the invention.
Figure 1B:
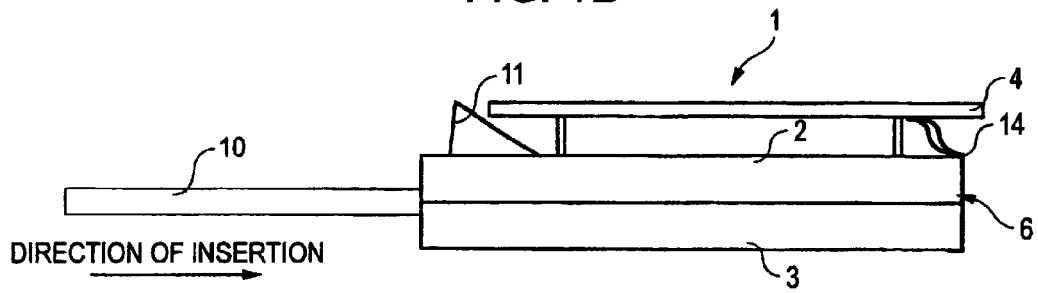
Figure 1C:
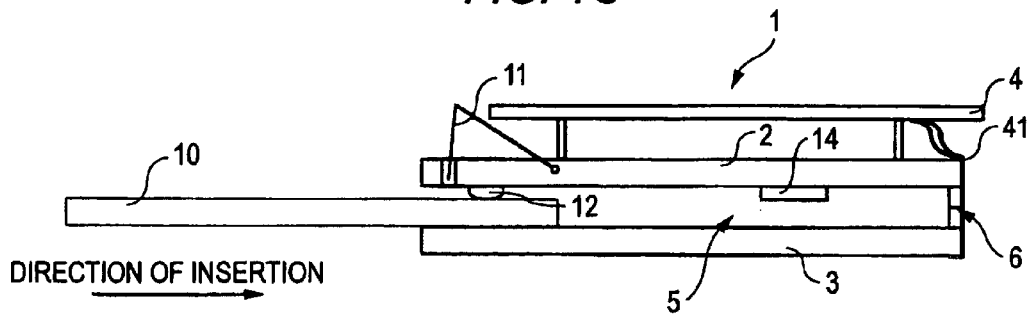

The card processor of this embodiment is used being incorporated in the apparatus (hereinafter referred to as host equipment) such as a cash dispensing machine (CD), an automated teller machine (ATM) and the like machine. FIG. 1 illustrates the card processor of this embodiment. FIG. 1(A) is a top view. FIG. 1(B) is a side view. FIG. 1(C) is a sectional view along the line A—A in FIG. 1(A). The card processor 1 is constituted by overlapping an upper plate 2 and a lower plate 3 obtained by molding a resin. Reference numeral 4 denotes a control circuit substrate. The control circuit substrate 4 is arranged over the upper plate 2. The control circuit substrate 4 may be arranged under the lower plate 3. An insertion passage 5 is formed between the upper plate 2 and the lower plate 3 so that a card 10 can be inserted therein.

In FIG. 1, an insertion portion is formed on the left side for inserting the card 10. On the side of the insertion portion, there are provided a shutter 11 for restricting the insertion of the card 10 and a magnetic head 12. The shutter 11 is driven by a solenoid that is not shown in the drawing. Further, a recessed portion 13 is formed on the side of the insertion port. Reference numeral 14 denotes a connection terminal that is electrically connected to an IC chip provided in the card 10 that is inserted in the insertion passage 5. A wall 6 is formed at an end on the side opposite to the insertion portion of the insertion passage 5. The wall 6 corresponds to a stopper member referred to in the invention.

The card 10 inserted in the insertion passage 5 through the insertion portion comes in contact at its leading end with the wall 6. Here, the length of the insertion passage 5 in the direction of insertion (length from the insertion portion to the wall 6) has been so determined that the rear end of the card 10 (end on the side of the insertion port) is positioned on the inside of the shutter 11 while a portion of the card 10 is exposed at the recessed portion 13. The area of the card 10 exposed at the recessed portion 13 is such that the card can be easily pinched by fingers, enabling the customer to easily insert and pull out or remove the card 10. The connection terminal 14 is arranged at a position where it is electrically connected to the IC chip of the card 10 that is in contact at its leading end with the wall 6.

The height of the insertion passage 5 is slightly higher than the height of the card 10. The control circuit substrate 4 is located in a housing of the host equipment in which the card processor 1 is incorporated. The control circuit substrate 4 cannot be touched from the external side. The housing of the host equipment is dented inward of the main body at a portion where the recessed portion 13 is located, permitting the customer to easily insert and pull out the card 10. Further, rollers which is not shown in the drawing can be arranged in the insertion passage 5 so that the card 10 can be smoothly inserted and pulled out.

A conductor 41 runs along the wall 6 and is secured at two places on the upper surface of the upper plate 2 and on the lower surface of the lower plate 3. An electric current is flowing through the conductor 41 at all times. When the wall 6 is broken, the conductor 41 is cut, and the interruption of electric current is detected. Thus, the breakage of the wall 6 is detected.

Figure 2:
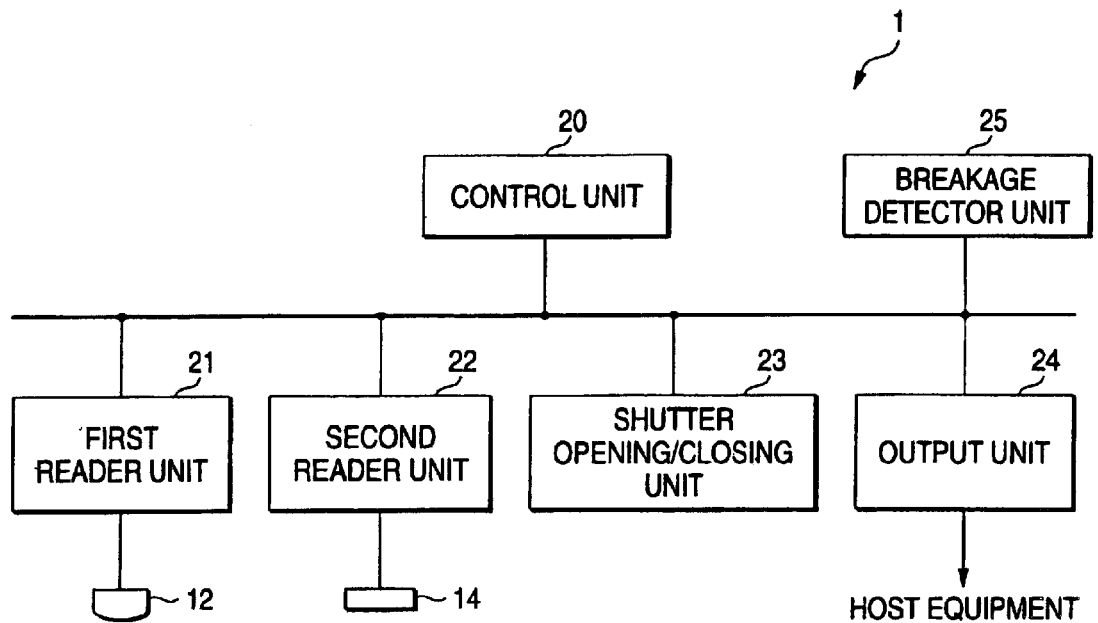
FIG. 2 is a block diagram of the card processor according to the embodiment of the invention.

FIG. 2 is a block diagram of the card processor 1 of this embodiment. A control unit 20 controls the operation of the main body. A first reader unit 21 reads the magnetic card data recorded in the magnetic stripe of the card 10 inserted in the main body. A second reader unit 22 reads electronic card data recorded in the IC chip of the card inserted in the main body. A shutter opening/closing unit 23 opens or closes the shutter 11 arranged near the insertion portion of the card. An output unit 24 outputs, to the host equipment, the card data read by the first reading unit 21 and by the second reading unit 22. A breakage detector unit 25 detects the breakage of the wall 6 at the end opposing the insertion port. The magnetic head 12 is connected to the first reading unit 21, and the connection terminal 14 is connected to the second reader unit 22. The shutter opening/closing unit 23 drives the shutter 11 by using a solenoid that is not shown in the drawing.

Described below is the operation of the card processor 1 according to the embodiment of the invention. The card 10 described here is a composite card being provided with the magnetic stripe and the IC chip. The card may be provided with either the magnetic stripe or the IC chip.

Figure 3:
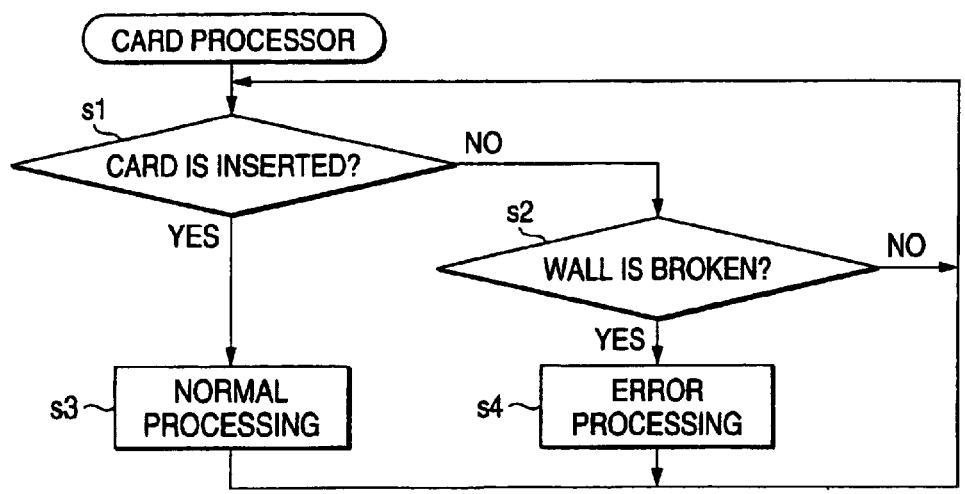
FIG. 3 is a flowchart illustrating the operation of the card processor according to the embodiment of the invention.
Figure 4A:
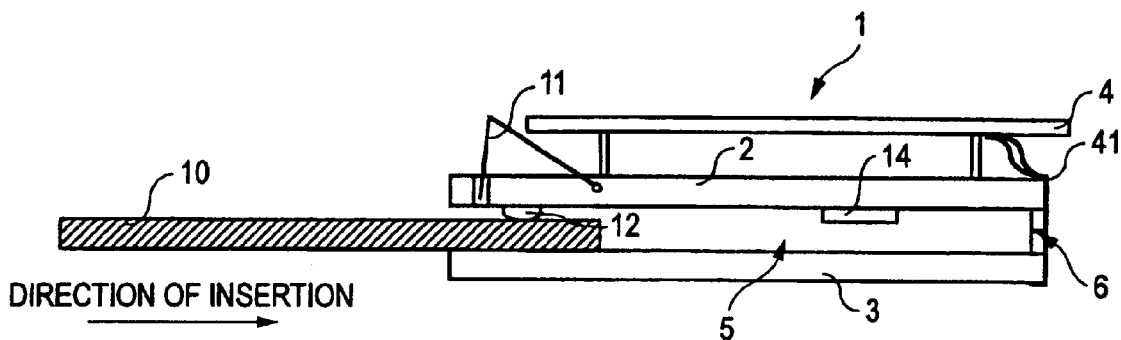
FIGS. 4A, 4B, and 4C, illustrates the card processor according to the embodiment of the invention.

FIG. 3 is a flowchart illustrating the operation of the card processor according to the embodiment. The card processor 1 is repetitively detecting whether the card 10 is inserted through the insertion portion and whether the wall 6 at the end facing the insertion port (wall 6 at the back of the insertion passage 5) is broken (s1, s2). If the card 10 is inserted, the card processor 1 executes a normal processing for reading the card data from the card 10 that is inserted (s3). If the breakage of the wall 6 is detected (s4), the card processor 1 executes an error processing First, described below with reference to FIG. 4 is the operation (normal operation at s3 in the FIG. 3) in a state where the wall 6 at the back of the insertion passage 5 has not been broken (in a state of not being broken). The customer inserts the leading end of the card 10 in the insertion passage 5 through the insertion portion, and pushes the card 10 into the main body (see FIG. 4(A)). At this moment, the insertion portion has not been blocked with the shutter 11. The magnetic stripe of the card 10 inserted in the insertion passage 5 by the customer is brought into contact with the magnetic head 12. The card processor 1 reads the magnetic data recorded in the magnetic stripe of the card 10.

Figure 4B:
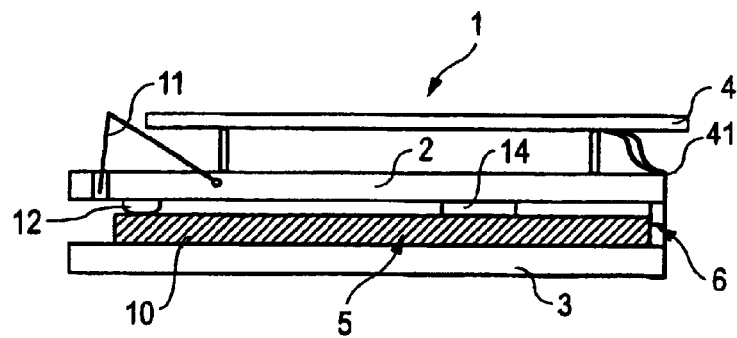

When the leading end of the card 10 comes into contact with the wall 6 on the side facing the insertion portion (see FIG. 4(B)), the customer judges that the card 10 cannot be inserted in the main body any more, and does not push the card 10 any more. At this moment, the rear end of the card 10 is located in the main body inside of the shutter 11. Besides, the magnetic head 12 is provided near the insertion portion and can read all magnetic data recorded in the magnetic stripe of the card 10. Further, the card 10 is partly exposed at the recessed portion 13, and the customer is allowed to easily push the card 10 until the leading end thereof comes in contact with the wall 6.

Figure 4C:
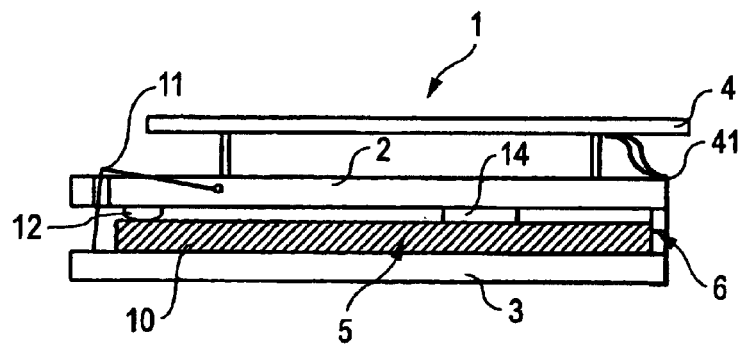

In a state where the leading end of the card 10 is in contact with the wall 6, the card processor 1 drives the shutter 11 to block the insertion portion, and electrically connects the connection terminal 14 to the IC chip of the card 10 to read the electronic data recorded in the IC chip of the card 10 or to record the electronic data therein (see FIG. 4(C)).

The shutter 11 may be driven and the connection terminal may be electrically connected relying upon a detection by a sensor that detects the contact of the leading end of the card 10 with the wall 6, or relying upon a mechanism that works when the leading end 10 of the card 10 comes in contact with the wall 6. The insertion portion is blocked with the shutter 11 in order to prevent the insertion of another card 10, and to prevent the customer from inadvertently taking out (removing) the card 10 from the main body while the data are being read out from, or recorded into, the IC chip.

After the data processing for the IC chip is completed, the card processor 1 drives the shutter 11 and opens the insertion portion (returns back to the state of FIG. 4(B)). The customer takes out the card 10 from the main body of the card processor 1. At this moment, the customer pulls out the card 10 by pinching a portion that is exposed in the recessed portion 13.

When the customer pulls out the card 10 from the main body of the card processor 1, the magnetic data recorded in the magnetic stripe of the card 10 can be read out.

The card processor 1 notifies the card data read out from the card 10 to the host equipment through the output unit 24. The host equipment carries out transaction processing based on the card data notified from the card processor 1 or the input operation by the customer who manipulates the operation unit of the host equipment that is not shown in the drawing.

Figure 5A:
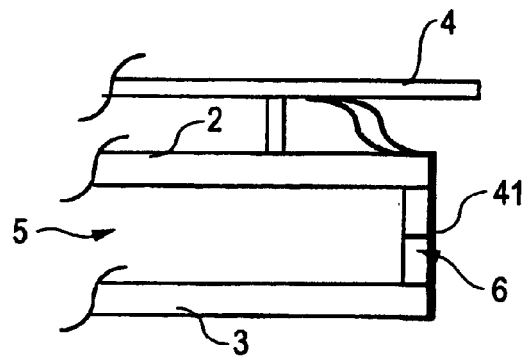
FIGS. 5A and 5B, illustrates a breakage detector unit in the card processor according to the embodiment of the invention.
Figure 5B:
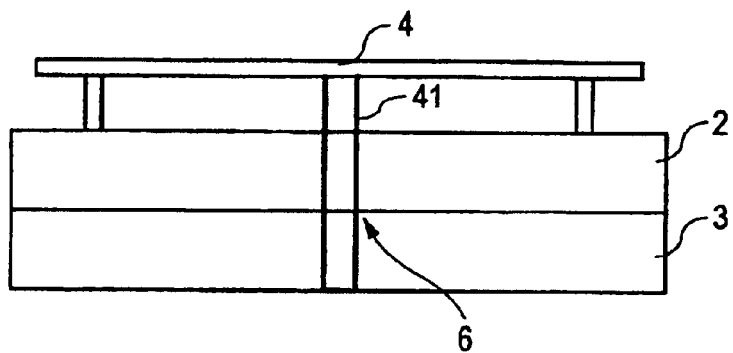
Figure 6:
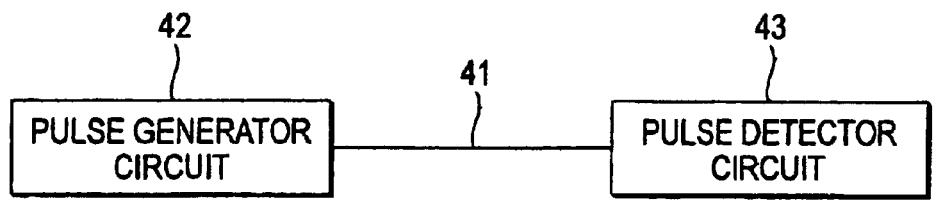
FIG. 6 is a diagram illustrating the breakage detector unit in the card processor according to the embodiment of the invention.

Described below is the mechanism for detecting whether the wall 6 on the side facing the insertion portion is broken. Referring to FIG. 5, the card processor 1 of this embodiment is such that a piece of conductor 41 is running along the wall 6 on the outer side of the insertion passage 5, the conductor 41 being connected at its both ends to the control circuit substrate 4. FIG. 5(A) is a side sectional view of the rear end (wall 6 side) of the card processor 1, and FIG. 5(B) is a back view of the card processor. The conductor 41 is secured at two places on the upper surface of the upper plate 2 and on the lower surface of the lower plate 3. Referring to FIG. 6, the breakage detector unit 25 includes a pulse generator circuit 42 connected to one end of the conductor 41 to generate pulse signals, and a pulse detector circuit 43 connected to the other end of the conductor 41 to detect pulse signals. The pulse generator circuit 41 and the pulse detector circuit 42 are formed on the control circuit substrate 4.

The pulse generator circuit 42 in the breakage detector unit 25 generates suitable pulse signals. When the above suitable pulse signals are detected by the pulse detector circuit 43, it is so judged that the wall 6 is normal without being broken. When the above suitable pulse signals have not been detected by the pulse detector circuit 43, on the other hand, it is so judged that the wall 6 is in an abnormal condition in which it is broken.

Figure 7A:
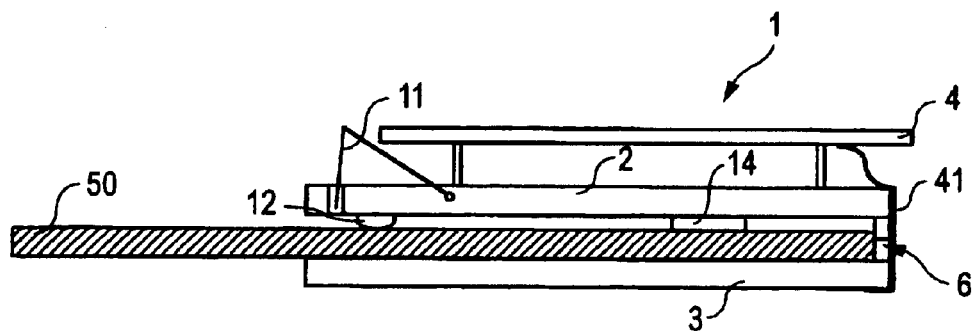
FIGS. 7A and 7B, illustrates the card processor according to another embodiment.
Figure 7B:
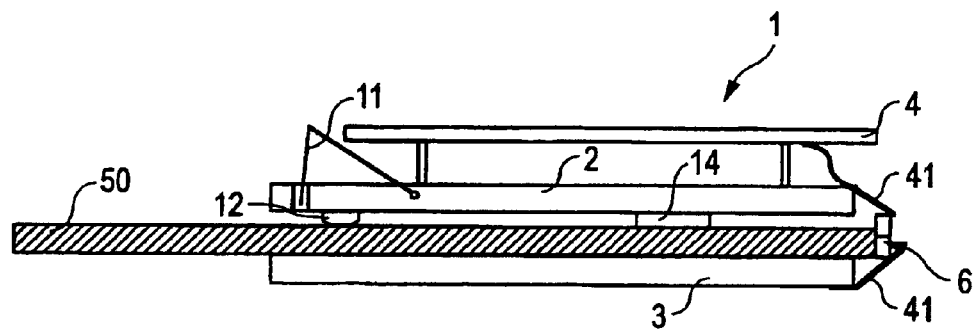

As described earlier, a thief who attempts to cheat the customer's card 10 tries to insert a steel plate 50 through the insertion portion as shown in FIG. 7 and further pushes the steel plate 50 into the main body beyond a state were the leading end of the steel plate 50 is in contact with the wall 6 (see FIG. 7(A)) to break the wall 6 that is serving as a stopper (see FIG. 7(B)). If the steel plate 50 is forcibly pushed into the main body of the card processor 1 to break the wall 6, the conductor 41 is cut due to the shock. The conductor 41 is attached to the upper plate 2 and to the lower plate 3. If the wall 6 is broken as shown in FIG. 7(B), therefore, the conductor 41 is cut being pushed by the wall 6 that is broken and by the steel plate 50. If the conductor 41 is cut, therefore, the pulse signals generated by the pulse generator circuit are not detected by the pulse detector circuit 43, as a matter of course. Upon detecting the pulse signals generated from the pulse generator circuit by the pulse detector circuit 43, therefore, it is allowed to detect the breakage of the wall 6 at the back of the insertion passage 5 facing the insertion port.

Upon detecting the breakage of the wall 6, the card processor 1 executes the error processing. The error processing executed may be, for example, the one for requesting the interruption of processing by the host equipment, the one for blocking the insertion portion by driving the shutter 11 so that the card 10 cannot be inserted by the customer, the one that displays the breakage of the wall 6 on a display portion of the card processor 1 or of the host equipment and produces an alarm sound letting the customer not to insert the card 10, or the one which informs the center of the breakage of the wall 6 urging the replacement of the card processor 1. A plurality of these processes may be executed in combination.

As soon as the breakage of the wall 6 is detected, the error processing is readily executed to inform the center of this fact, which may make it possible to catch the thief who has broken the wall 6 while he is still removing the steel plate 50 from the card processor 1, offering the effect for suppressing the crime.

As the error processing, further, if the shutter 11 is driven to block the insertion portion, the customer is reliably prevented from inserting the card 10 in the insertion portion of the card processor 1 of which the wall 6 that works as a stopper has been broken. This reliably prevents such an occurrence that the customer inserts the card 10 through the insertion portion without knowing that the wall 6 has been broken, pushes the card 10 until even a portion of the card 10 is not exposed at the recessed portion 13, finds himself unable to take out the card 10 that is pushed in, and goes for a clerk in charge, and that the card 10 stolen by the thief who has broken the wall 6.

In a state where the steel plate 50 is inserted in the insertion passage 5, the insertion portion cannot be blocked even by driving the shutter 11 (the end of the shutter comes into a halt on the upper surface of the steel plate 50). When the steel plate 50 is removed from the insertion passage 5, the insertion portion is blocked by the shutter 11.

Figure 8A:
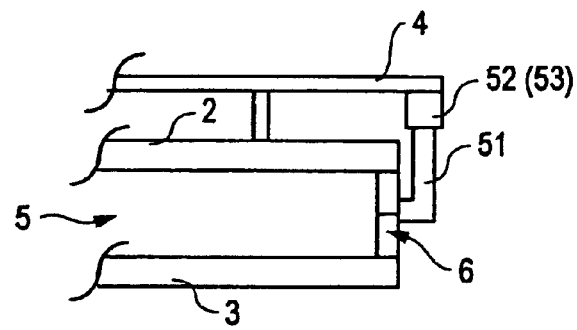
FIGS. 8A and 8B, is a illustration of the breakage detector unit of the card processor according to a further embodiment.
Figure 8B:
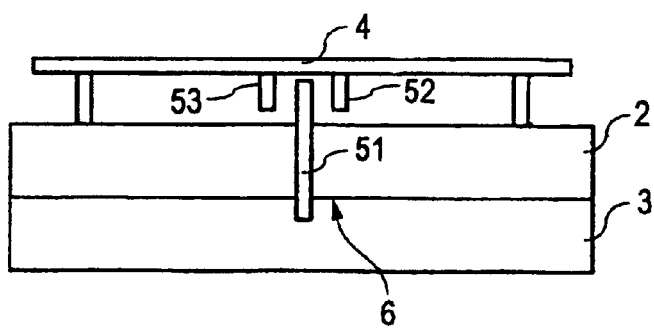
Figure 9:
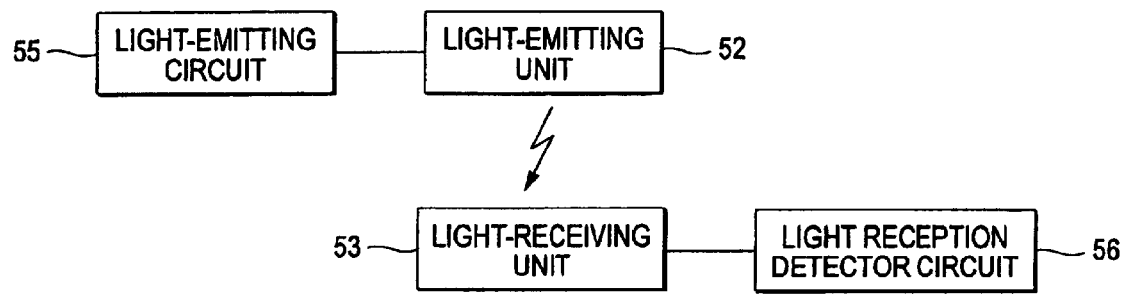
FIG. 9 illustrates the breakage detector unit in the card processor according to a further embodiment.

FIG. 8 is a view illustrating another embodiment of the breakage detector unit. FIG. 8(A) is a side sectional view of the rear end (wall 6 side) of the card processor 1, and FIG. 8(B) is a back view of the card processor. In the breakage detector unit 25, a pawl portion 51 is provided on the outer side of the wall 6 that works as the stopper, and a light-emitting unit 52 and a light-receiving unit 53 are opposed to each other with the pawl portion 51 interposed therebetween. The breakage detector unit 25 is provided, as shown in FIG. 9, with a light-emitting circuit 55 for causing the light-emitting unit 52 to emit light and a light reception detector circuit 56 for detecting whether the light from the light-emitting portion 52 has been received by the light-receiving unit 53. The light-emitting unit 52 and the light-receiving unit 53 are mounted on the control substrate 4. Further, the light-emitting circuit 55 and the light reception detector circuit 56 are mounted on the control substrate 4.

When the wall 6 at the back of the insertion passage 5 facing the insertion portion has not been broken, the pawl portion 51 is located between the light-emitting unit 52 and the light-receiving unit 53, and the light from the light-emitting unit 52 is not received by the light-receiving unit 53.

Figure 10A:
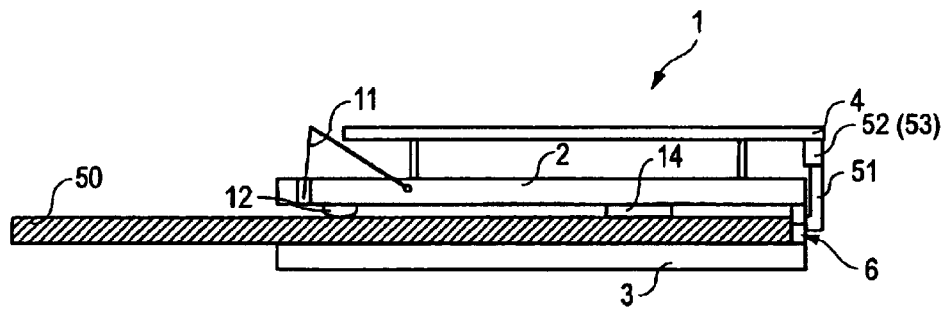
FIGS. 10A and 10B, illustrates illustrates the card processor according to a further embodiment.
Figure 10B:
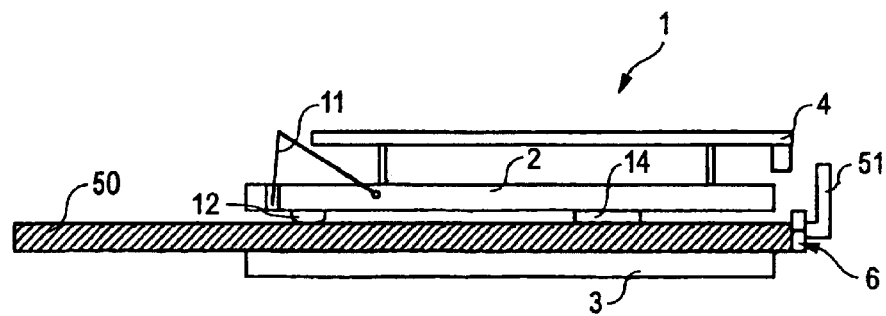

Referring to FIG. 10, the steel plate 50 is inserted through the insertion portion, and is further pushed into the main body beyond the state where the leading end of the steel plate 50 is in contact with the wall 6 (see FIG. 10(A)) to break the wall 6 that works as the stopper (see FIG. 10(B)). In the card processor 1 of this embodiment, if the steel plate 50 is forcibly pushed into the main body to break the wall 6, the pawl portion 51 moves together with the wall 6 that is broken. In the light-receiving unit 53, therefore, the light from the light-emitting unit 52 is not shielded; i.e., the light from the light-emitting unit 52 is received by the light-receiving unit 53. Upon detecting whether the light from the light-emitting unit 52 is received by the light-receiving unit 53 by using the light reception detector circuit 56, therefore, it is allowed to detect the breakage of the wall 6 at the back of the insertion passage 5 facing the insertion port.

The light-emitting unit 52 and the light-receiving unit 53 are mounted on the control substrate 4, and do not move together with the broken wall 6. Besides, the electric connection between the light-receiving unit 53 and the light reception detector circuit 56 is not cut.

When the breakage of the wall 6 at the back of the insertion passage 5 facing the insertion portion is detected, the above error processing may be executed.

In the above embodiment, if the breakage of the wall 6 at the back of the insertion passage 5 facing the insertion portion is detected by the breakage detector unit 25, the error processing is executed to prevent the customer from inserting the card 10 in the card processor 1. It is, however, also allowable to provide the wall 6 with a shielding member that is directly or indirectly anchored thereto, and to block the insertion passage with the shielding member in case the wall 6 is broken and the anchored state is reset. In this case, the breakage detector portion 25 is not required and the cost can be decreased.

Described below in connection with FIG. 11 is an embodiment of the card processor provided with the shielding member. In FIG. 11, components which are shared with the embodiment illustrated by FIG. 1 are denoted by the same reference numerals but their description is not repeated.

Figure 11A:
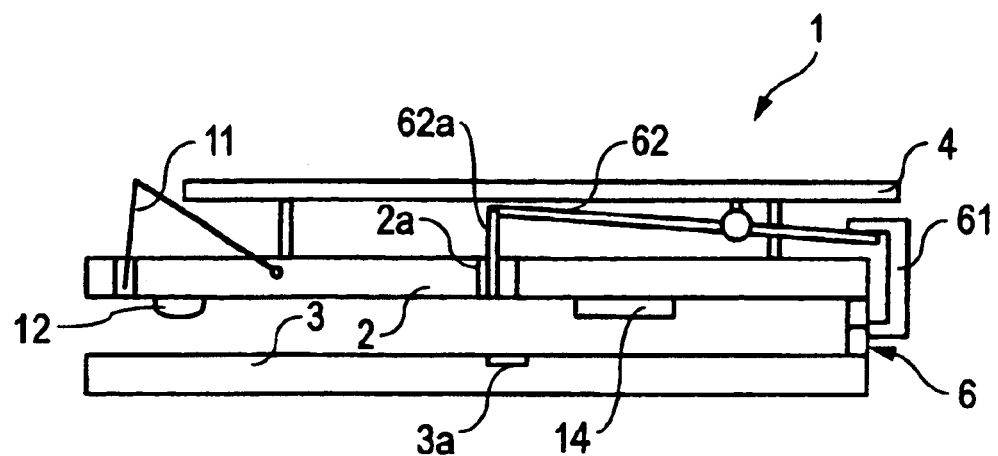
FIGS. 11A and 11B, illustrates illustrates the card processor according to a further embodiment.

Referring to FIG. 11(A), a hook 61 is formed on the wall 6, and one end (rear end) of a shielding member 62 that is swingably attached is anchored to the hook 61. A fulcrum of the shielding member 62 is located relatively close to the rear end, and a swinging force is acting in a direction in which the front end moves downward due to its own weight. Further, the front end of the shielding member 62 is bent downward. Hereinafter, the portion that is bent is referred to as folded portion 62*a*.

An opening 2*a* is formed in the upper plate 2 permitting the folded portion 62*a* of the shielding member 62 to pass therethrough. Further, a groove 3*a* is formed in the lower plate 3 permitting an end of the folded portion 62*a* to enter therein.

In a state where the wall 6 at the back of the insertion passage 5 facing the insertion portion has not been broken, the rear end of the shielding member 62 is anchored by the hook 61, and the end of the folded portion 62*a* of the shielding member 62 is not protruding into the insertion passage. In this state, therefore, the card 10 can be smoothly inserted through the insertion port.

Figure 11B:
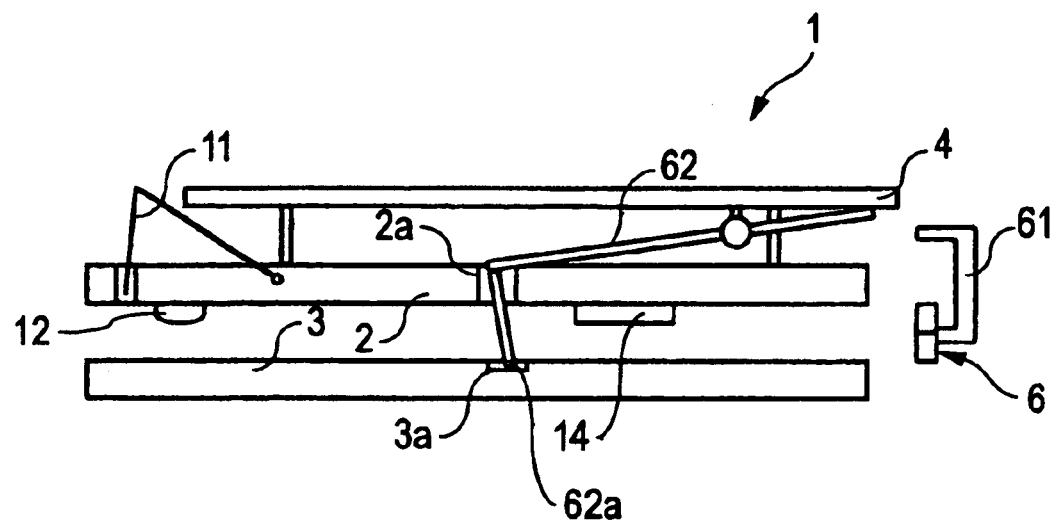

If the wall 6 at the back of the insertion passage 5 facing the insertion portion is broken as shown in FIG. 11(B), on the other hand, the hook 61 moves together with the broken wall 6, the rear end of the shielding member 62 is disengaged, and the folded portion 62*a* swings down. The end of the folded portion 62*a* enters into the groove 3*a* formed in the lower plate 3. Accordingly, the insertion passage 5 is shielded by the folded portion 62*a* of the shielding member 62, and even if it is attempted to insert the card 10, the card is inserted only into a position where the leading end of the card 10 comes in contact with the folded portion 62*a*. This prevents such an occurrence that the customer pushes the card 10 into the card processor 1 of which the wall 6 at the back of the insertion passage 5 facing the insertion portion has been broken, the card 10 being pushed in to such a degree that the customer can no longer take it out and falls in the hand of the thief.

When the rear end of the shielding member 62 is in a state of not anchored, the shielding member 62 may be reliably turned in the direction in which the front end moves down by being urged by a resilient member such as a spring or a rubber.

Next, described below is a further embodiment. Referring to FIG. 12, the card processor 1 of this embodiment has a carrier passage constituted by three members including an upper plate 71, a lower plate 72 and a coupling portion 73. As shown in FIG. 12, the coupling portion 73 is of a U-shape. Referring to FIG. 12(B), the upper plate 71, lower plate 72 and coupling portion 73 are assembled by insertion. At this moment, the upper plate 71 and the lower plate 72 are adhered at contact portions on both sides of the insertion passage 5. They, however, are not adhered at portions where they are inserted in the coupling portion 73. Further, a groove 72a is formed in the lower plate 72. The upper plate 71 is shorter than the lower plate 72 as shown.

As shown in FIG. 12(C), the control substrate 4 is secured to the upper plate 71. Further, an opening is formed in the control substrate 4, and a shielding member 75 is inserted in the opening. The opening in the control substrate 4 is positioned just on the groove 72a formed in the lower plate 72. The shielding member 75 is in a state of being placed on the upper surface of the coupling member 73.

Here, as will be obvious from FIG. 12(C), the wall 6 at the back of the insertion passage facing the insertion portion is constituted by a coupling member. It can therefore be said that the shielding member 75 is indirectly anchored to the wall 6.

As described above, if the steel plate is inserted through the insertion portion to break the wall 6 at the back of the insertion passage facing the insertion portion, the coupling member 73 is removed from the upper plate 71 and the lower plate 72 as shown in FIG. 13, the shielding member 75 placed on the coupling member 73 falls, and the lower end of the shielding member 75 enters into the groove 72a of the lower plate 72. At this moment, the upper end of the shielding member 75 is positioned over the control substrate 4. Due to the opening in the control substrate 75 and the groove 72a in the lower plate 72, therefore, the shielding member 75 does not fall but maintains its attitude.

The upper plate 71 is adhered to the lower plate 72 on both sides of the insertion passage 5. As shown in FIG. 13, therefore, the upper plate 71 does not fall even when the coupling member 73 is removed from the upper plate 71 and the lower plate 72. Further, the control substrate 4 is mounted on the upper plate 71, and does not fall.

In a state shown in FIG. 13, the insertion passage 5 is shielded by the shielding member 75. Therefore, if it is attempted to insert the card 10 through the insertion portion, the card can be inserted only into a position where the leading end of the card 10 comes in contact with the shielding member 75. Therefore, this prevents such an occurrence that the customer pushes the card 10 into the card processor 1 of which the wall 6 at the back of the insertion passage 5 facing the insertion portion has been broken, the card 10 being pushed in to such a degree that the customer can no longer take it out and falls in the hand of the thief The above embodiments have dealt with the cases where the wall 6 at the back of the insertion passage 5 facing the insertion portion served as a stopper. As the stopper, however, there can be employed any other constitution with which will come in contact the leading end of the card 10 that is inserted through the insertion portion preventing the card 10 from being pushed in the main body any more, such as a plurality of pins arranged in the direction of width of the insertion passage 5.

In the embodiments shown in FIGS. 11 to 13, further, no breakage detector unit 25 is employed. However, it should be recognized that these embodiments may be modified to include the breakage detector unit 25, in order to permit breakages to be communicated to the center. The present invention therefore include several embodiments wherein any attempt by a customer to insert the card is prevented when the stopper member which limits the length of insertion of the card in the main body has been broken, in order to prevent the customer's card from being stolen.

While preferred embodiments of the invention have been described and illustrated above, it should be understood that these are exemplary of the invention and not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A card reader for reading card data recorded in a card, comprising:
    an insertion passage adapted to accept a card, said insertion passage including a stopper member with which an end of the card comes in contact with when it is inserted in a main body by a predetermined length;
    a breakage detector for detecting whether said stopper member has been broken; and
    an error processor, coupled to said breakage detector, for executing an error process when the breakage of said stopper member is detected by said breakage detector.

2. The card reader of claim 1, further comprising:
    a conductor, said conductor running along said stopper member;
    wherein said breakage detector detects whether the conductor has been cut.

3. The card reader of claim 1, wherein said stopper member further comprises:
    a pawl portion formed at a position between a light-emitting unit and a light-receiving unit arranged facing each other, and said breakage detector detects whether said light-receiving unit is receiving light emitted from said light-emitting unit.

4. The card reader of claims 1, 2, or 3, further comprising:
    a shutter member driven between a first state when said insertion passage is blocked and a second state when said insertion passage is opened;
    wherein, when said breakage detector has detected the breakage of said stopper member, the shutter member is driven to said first state.

5. A card reader comprising:
    an insertion passage adapted for accepting a card, said insertion passage comprising a stopper member in which an end of the card comes into contact when it is inserted in a main body by a predetermined length; and
    a shielding member, said shielding member being directly or indirectly anchored to said stopper member;
    wherein said shielding member shields said insertion passage when said stopper member has been broken or is in a state of not being anchored.

6. The card reader of claim 5, further comprising:
    a breakage detector for detecting the breakage of said stopper member; and
    an error processor for executing an error process when the breakage of said stopper member is detected by said breakage detector.

7. A card reader comprising:
    an insertion passage for accepting a card, said insertion passage including a stopper member with which an end of the card comes in contact when the card is inserted in said insertion passage by a predetermined length; and
    a breakage detector for detecting whether said stopper member has been broken.

* * * * *